United States Patent [19]

Cutts

[11] Patent Number: 5,379,065
[45] Date of Patent: Jan. 3, 1995

[54] PROGRAMMABLE HYPERSPECTRAL IMAGE MAPPER WITH ON-ARRAY PROCESSING

[75] Inventor: James A. Cutts, Pasadena, Calif.

[73] Assignee: The United States of America as represented by the Administrator of the National Aeronautics and Space Administration, Washington, D.C.

[21] Appl. No.: 904,550

[22] Filed: Jun. 22, 1992

[51] Int. Cl.⁶ .............................................. H04N 9/04
[52] U.S. Cl. ..................................... 348/269; 348/207
[58] Field of Search ............... 358/209, 222, 125, 126, 358/42, 41, 109; 250/208.1, 226, 216, 370.06, 370.08, 332; H04N 7/18, 9/04, 5/225; 348/207, 363, 362, 367, 117, 119, 273, 274, 268, 269, 270

[56] References Cited

U.S. PATENT DOCUMENTS

| | | | |
|---|---|---|---|
| 4,330,833 | 5/1982 | Pratt et al. | 364/515 |
| 4,398,256 | 8/1983 | Nussmeier et al. | 382/41 |
| 4,497,540 | 2/1985 | Breckinridge et al. | 350/168 |
| 4,514,767 | 4/1985 | Kubota et al. | 358/280 |
| 4,551,768 | 11/1985 | Tsuchiya et al. | 358/283 |
| 4,555,732 | 11/1985 | Garcia | 358/293 |
| 4,574,357 | 3/1986 | Pastor et al. | 364/518 |
| 4,652,928 | 3/1987 | Endo et al. | 358/213.28 |
| 4,694,342 | 9/1987 | Klees | 358/167 |
| 4,703,513 | 10/1987 | Gennery | 382/27 |
| 4,707,859 | 11/1987 | Nudd et al. | 382/28 |
| 4,724,544 | 2/1988 | Matsumoto | 382/27 |
| 4,731,864 | 3/1988 | Modla | 382/54 |
| 4,747,157 | 5/1988 | Kurakake et al. | 382/41 |
| 4,765,564 | 8/1988 | Colvocoresses | 358/215.28 |
| 4,786,964 | 11/1988 | Plummer et al. | 358/44 |
| 4,792,231 | 12/1988 | Fried | 356/354 |
| 4,827,528 | 5/1989 | Macovski | 382/6 |
| 4,885,787 | 12/1989 | Okamoto et al. | 382/54 |
| 4,947,446 | 8/1990 | Jutand et al. | 382/54 |
| 5,023,921 | 6/1991 | Goutte et al. | 382/58 |

Primary Examiner—Michael T. Razavi
Assistant Examiner—Tuan V. Ho
Attorney, Agent, or Firm—John H. Kusmiss; Thomas H. Jones; Guy M. Miller

[57] ABSTRACT

A hyperspectral imager includes a focal plane having an array of spaced image recording pixels receiving light from a scene moving relative to the focal plane in a longitudinal direction, the recording pixels being transportable at a controllable rate in the focal plane in the longitudinal direction, an electronic shutter for adjusting an exposure time of the focal plane, whereby recording pixels in an active area of the focal plane are removed therefrom and stored upon expiration of the exposure time, an electronic spectral filter for selecting a spectral band of light received by the focal plane from the scene during each exposure time and an electronic controller connected to the focal plane, to the electronic shutter and to the electronic spectral filter for controlling (a) the controllable rate at which the recording is transported in the longitudinal direction, (b) the exposure time and (c) the spectral band so as to record a selected portion of the scene through M spectral bands with a respective exposure time $t_q$ for each respective spectral band q.

33 Claims, 8 Drawing Sheets

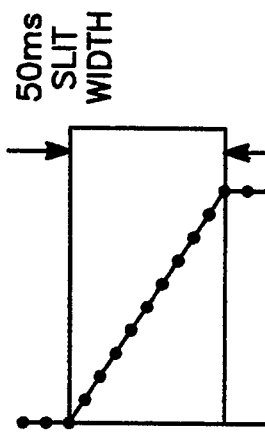
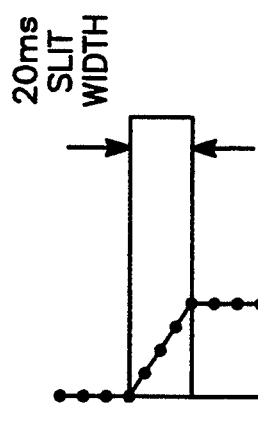
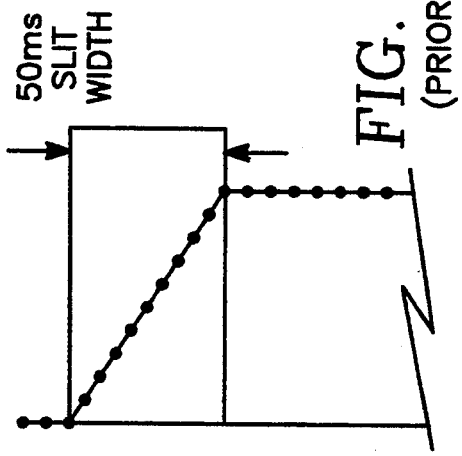
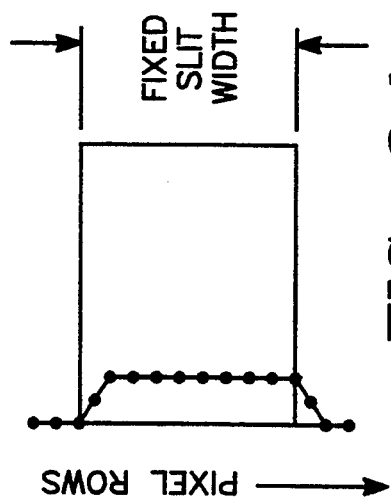
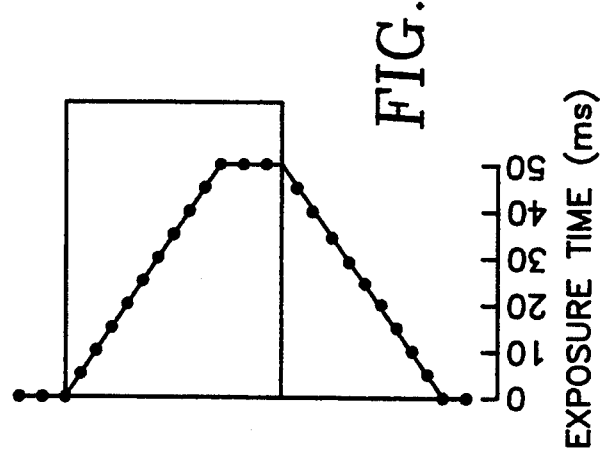
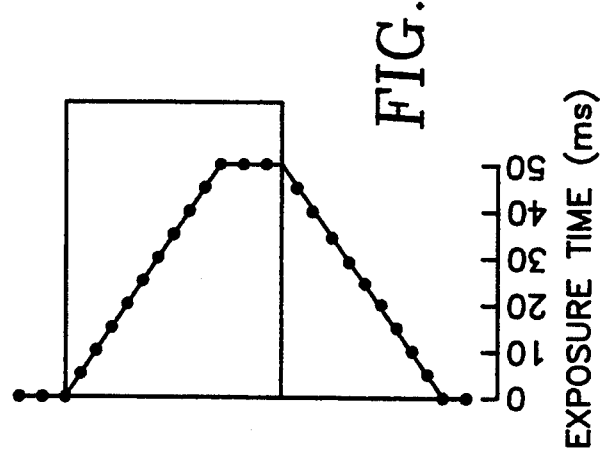
FIG. 2a (PRIOR ART)
FIG. 2b (PRIOR ART)
FIG. 2c (PRIOR ART)
FIG. 2d
FIG. 2e
FIG. 2f

PROGRAMMABLE HYPERSPECTRAL IMAGE MAPPER WITH ON-ARRAY PROCESSING

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention relates to spectral imaging devices useful in flight vehicles including space vehicles for acquiring color images of a ground surface.

2. Background Art

Various imaging techniques are well-known in the art. U.S. Pat. No. 4,514,767 discloses a color filter with a computer-controlled imaging device which capable of synchronizing the selection of the color filter with the scrolling of the imaging device. U.S. Pat. Nos. 4,827,528; 4,747,157; 4,551,768 and 4,398,256 disclose the technique of co-adding image pixels to enhance signal to noise ratio, but are not related to spectral filtering. U.S. Pat. Nos. 4,947,446; 4,885,787; 4,574,357; 4,703,513; 4,330,833; 4,707,859 and 4,724,544 disclose various electronic digital image filtering techniques not related to pixel co-adding or spectral filtering. U.S. Pat. Nos. 5,023,921; 4,694,342 and 4,731,864 disclose various spatial filtering techniques not related to pixel co-adding or spectral filtering. U.S. Pat. No. 4,792,231 discloses a laser speckle imaging technique for satellites not related to spectral filtering or pixel co-adding.

During the 1970's, NASA launched a number of LANDSAT spacecraft equipped with multispectral sensors. These sensors, equipped with between four and seven simultaneous spectral channels, mapped the surface of earth at ground resolutions of approximately 30 m. They have been applied to a great variety of investigations of the earth's surface, atmosphere and biosphere. In the 1980's, it has been France that has lead in the further development of orbital multispectral sensing. Imagery acquired with the SPOT satellite has a comparable number of spectral channels to LANDSAT, but the surface resolution has been improved.

During the 1980's, NASA has been pioneering the development of hyperspectral sensors which would De capable of mapping the surface of the earth in more than a hundred simultaneous spectral channels. With this heightened degree of spectral characterization, hyperspectral sensing enables identification of surface materials and much more definitive characterization of earth surface processes than is possible with multispectral sensing. However, the hyperspectral sensing technology presents some formidable instrumental, communications and data processing problems.

IMAGING SPECTROMETER TECHNOLOGY

The instrumentation technology used to implement hyperspectral sensing to date has been quite different than that used in multispectral sensing. In the hyperspectral imaging concepts proposed to date, such as in U.S. Pat. No. 4,497,540 to Breckinridge et al., the scene has been imaged on a spatially confining aperture or slit and dispersed to illuminate a detector array using a diffraction grating or prism. In this way, all spectral channels are acquired simultaneously and the field of view in each spectral channel is precisely the same. This is the key feature of "imaging spectrometry" which can be contrasted with "spectral imaging" in which different spectral channels are acquired sequentially in time and are not inherently spatially registered to one another.

Although imaging spectrometry is currently the technology of choice for hyperspectral sensing it has limitations. Let us consider the HIRIS instrument which is designed to map the earth's surface from 800 km altitude at 30 m spatial resolution. HIRIS images the Earth's surface on a narrow slit and then disperses the radiation transmitted or reflected from the slit such that it illuminates a two dimensional focal plane array (FPA). The FPA is scanned and read out each time the scene advances by one pixel width (equivalent to the slit width and the size of a spatial resolution element on the ground) by virtue of the orbital motion of the spacecraft.

Since the orbital motion of a spacecraft is constrained by the laws of celestial dynamics, this mode of operation renders the imaging spectrometer a rather inflexible instrument. At the HIRIS altitude of 850 km., the exposure time is 3.9 ms and for some scenes of low reflectivity the signal levels are already very low. In particular, the exposure time will inevitably decrease with increasing spatial resolution and further degrade signal-to-noise. The HIRIS already seems to be approaching a practical limit of 30 meters. In additional, the FPA must be read more rapidly in order to avoid spatially smearing the image. In practice this severely limits the applicability of the imaging spectrometry techniques to fairly coarse surface resolution and results in large and expensive instruments to achieve maximum optical throughput.

The technique of acquiring multispectral mutually-registered, high signal-to-noise spectral images of stationary or slowly-moving targets by viewing the scene through a spectral filter is well established. It has been implemented on a number of space missions using stepped mechanical filters wheels. The limitations of the technique are (1) the number of filters that can be practically employed in such a system, (2) the speed at which they can be changed and (3) the limitation to sequential access.

SUMMARY OF THE INVENTION

Motivated by the foregoing limitations of imaging spectrometer technology, and by the recent emergence of new concepts in electrically programmable high resolution spectrally agile filters (SAF's), the potential of hyperspectral imagers has been greatly expanded in the present invention. The present invention is a Programmable Hyperspectral Imaging Mapper with on Array Processing (PHIMAP). The enhanced capabilities of PHIMAP reside not only in the SAF but also in the exploitation of signal processing on the focal plane array. The present invention exploits the development of electrically-addressable SAF's based on Acousto Optic Tunable Filter (AOTF) technology to solve all three of the problems or limitations of viewing the scene through a spectral filter using stepped mechanical filter wheels. As a result the present invention makes a true hyperspectral capability feasible.

The specific application discussed here, however, is hyperspectral imaging from a platform in low earth orbit with rapid ground motion. Hitherto, SAF's have not been thought to be useful in imaging for land remote sensing. As we shall show, there are methods of exploiting spectral agility provided they are used in conjunction with signal processing on the focal plane and they conifer a number of advantages over other techniques of acquiring hyperspectral data.

The invention synchronizes changes in spectral pass band with frame transfers of an imager such as a focal plane array (FPA). Different spectral bands (colors) may be given different exposure times, depending upon the desired degree signal quality enhancement for individual spectral bands. The detected image is transferred in the FPA along the direction of motion with respect to the scene in synchronism therewith so that successive pixels of the FPA view the same scene elements successively and their outputs are co-added to enhance signal-to-noise. Rather than permitting slit width to dictate a fixed exposure time, the invention permits rapid change in exposure time between spectral bands by electronically shuttering the FPA.

BRIEF DESCRIPTION OF THE DRAWINGS

FIGS. 2a through 2c illustrate prior art techniques for performing conventional image motion compensation for three different exposure times.

FIGS. 2d through 2f illustrate image motion compensation or pixel co-adding for exposure times corresponding to FIGS. 2a through 2c, respectively.

DETAILED DESCRIPTION OF THE INVENTION

I. CONCEPT

Figure 1:
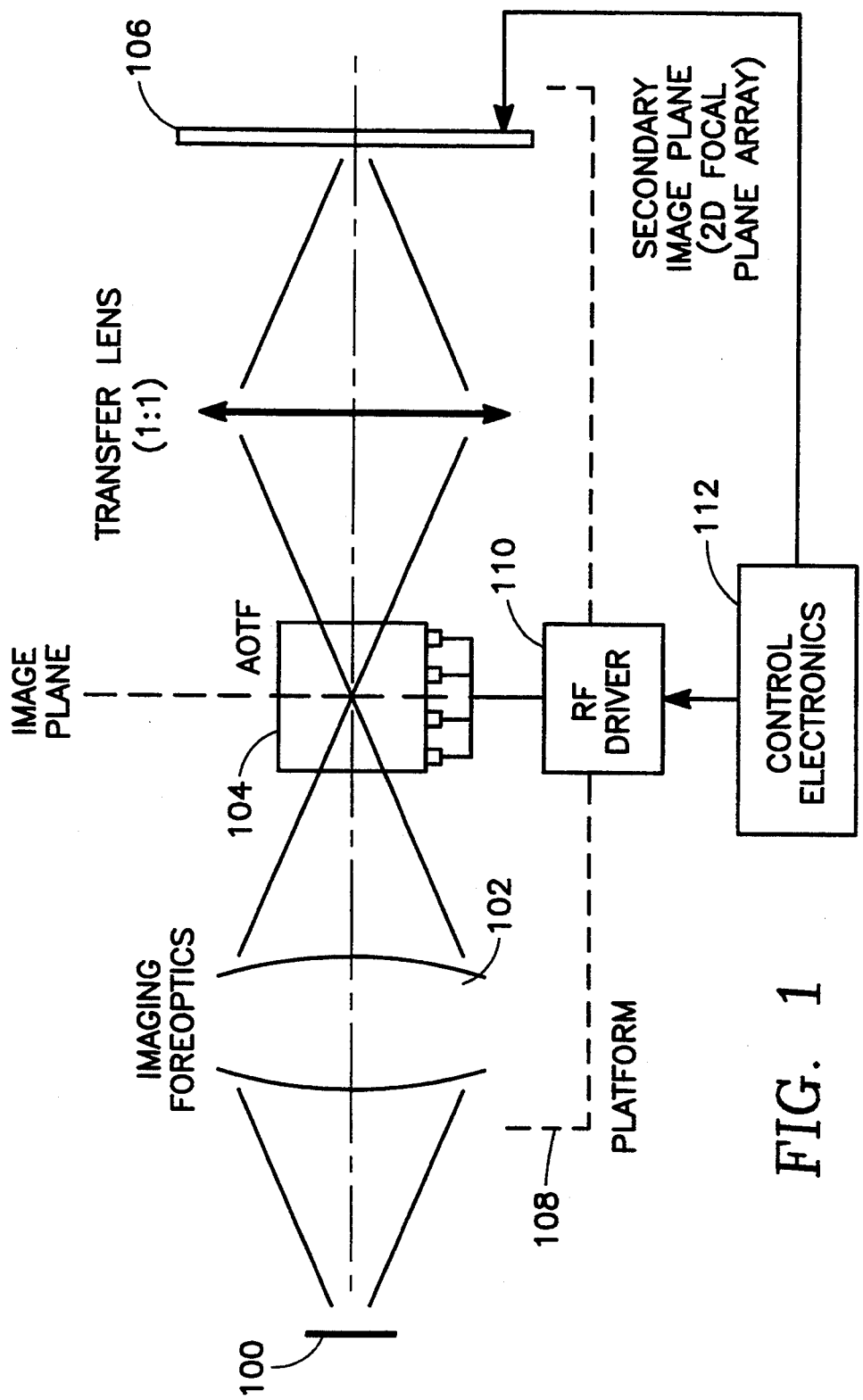
FIG. 1 is a simplified block diagram illustrating system embodying the invention.

The imaging geometry is illustrated in FIG. 1. An image or scene of the surface of the Earth (for example) is focussed by imaging foreoptics 102 through a Spectrally Agile Filter (SAF) 104 such as an AOTF on to the surface of an imaging device 106. The foreoptics 102, the SAF 104 and the imaging device 106 are all mounted on an airborne or orbiting platform which is moving relative to the scene 100. The imaging device must possess three functions: registering the input of optical radiation, storage of this information in some form that preserves its spatial character, and transmittal or readout of the information for display. In some media, certain of these functions may be subsumed in the same part of the device. In this section, we consider the most general form of the invention when the imaging device is either a continuous recording medium such as photographic film or a pixellated device or focal plane array (FPA) comprised of an array of discrete detectors. In section II, we consider in more detail the realization with a focal plane array. Then in section III we consider a specific form of the invention using a particular kind of focal plane array, a Charge Coupled Device (CCD).

Image motion compensation is an element of the preferred embodiment of invention. Here, we consider first the general concepts of image motion compensation, how a conventional image motion compensation system is implemented, and then how image motion compensation is implemented in the present invention. Finally, we describe how rapid spectral pass band changes, obtained with the SAF, can be used with a single imaging device to obtain multiple mutually-registered strips of motion-compensated images in which each strip is acquired through a different spectral filter.

A. Image Motion Compensation—General

When high resolution cameras are used to obtain a near vertical view of the surface of the earth (or another planet) from an aircraft or a spacecraft in a low altitude orbit, the optical image is not stationary in the focal plane but moves rapidly across it because of the motion of the platform relative to the ground. To acquire a blur-free recorded image, one approach is to expose the sensor for a time short with respect to the time taken for the optical image to move by a resolution element. However, if the scene luminance is low, a situation which is exacerbated using narrow spectral bands, insufficient light is collected during the exposure time and the resulting image has low signal-to-noise. Image motion compensation is any scheme for causing the photo-detection and/or storage medium to be transported at the same speed as the optical image thereby allowing much larger exposure times.

The PHIMAP concept uses a form of image motion compensation which is quite different from conventional systems. To set the proper context for the discussion of the PHIMAP implementation, a conventional image motion compensation system is first described.

B. Conventional Image motion Compensation

A conventional image motion compensation system consists of a focal plane aperture slit which limits the area of the focal plane over which light can reach the photo-recording medium. As a result of spacecraft motion, the scene moves at a uniform speed across the slit. The photo-recording and storage medium behind the slit is transported either mechanically or electronically at the same rate as the scene to compensate for image motion.

The process is illustrated in FIGS. 2a through 2c for 10 ms, 20 ms and 50 ms exposure times, respectively. These require slits of progressively greater width (along track dimension) indicated in solid line. FIGS. 2a-through 2c are graphs plotting the exposure time as a function of position along the flight line. Before the scene passes the slit, the exposure is zero; as it crosses the slit it increases linearly to a maximum of either 10, 20 or 50 ms; and beyond the slit it maintains a constant value.

This approach works very well with a single sensor for monochromatic imaging. It is implemented photographically by transporting film from one spool to another under the slit. It can also be implemented electronically with a "bucket-brigade type" focal plane array such as a charge coupled device (CCD). Charge is clocked into a temporary storage register at the edge of the slit from where it is read out and recorded on a sequential recording medium such as magnetic tape. In either film or electronic realization, a continuous image of uniform exposure is produced.

C. Image motion compensation with PHIMAP

Image motion using the PHIMAP concept of the present invention has some important differences from the conventional approach. First, the same fixed aperture slit is used for all exposure times. A high speed electronic shuttering and readout mechanism replace the uniform transport of the photosensing and storage medium behind the slit. The purpose is to allow information for the same part of the surface to be recorded in several spectral bands using a single focal plane array.

The process is illustrated in FIGS. 2d through 2f for 10 ms, and 50 ms exposure times. As indicated in FIGS. 2d through 2f, the same slit width is used for each of the three different exposure times. The exposure time is varied by controlling the time during which the photosensitive surface is activated. At the end of that time, the stored image is transported rapidly to a masked-off area for read out.

The exposure time (dotted line) is plotted as function of distance along the flight line at the conclusion of the integration process. Note that there is a uniformly illuminated or exposed part of the image segment which is narrower than the slit. Beyond the uniformly exposed part, exposure ramps down linearly both up-track and down-track. Note also what happens when the exposure time is increased. It is clear that the exposure level can be increased but only at the expense of making the region of uniform exposure narrower.

D. Conditions for complete image strips in a PHIMAP implementation.

One can conceive of ways of reconstructing images from mosaics using both the uniformly illuminated image segments and the ramps on either side of the uniformly exposed regions of FIGS. 2c-2f. However, in most applications it is simpler to discard the ramps and to use a wider slit which exposes a larger photosensitive area to minimize the performance consequences of discarding the ramps.

Figure 3:
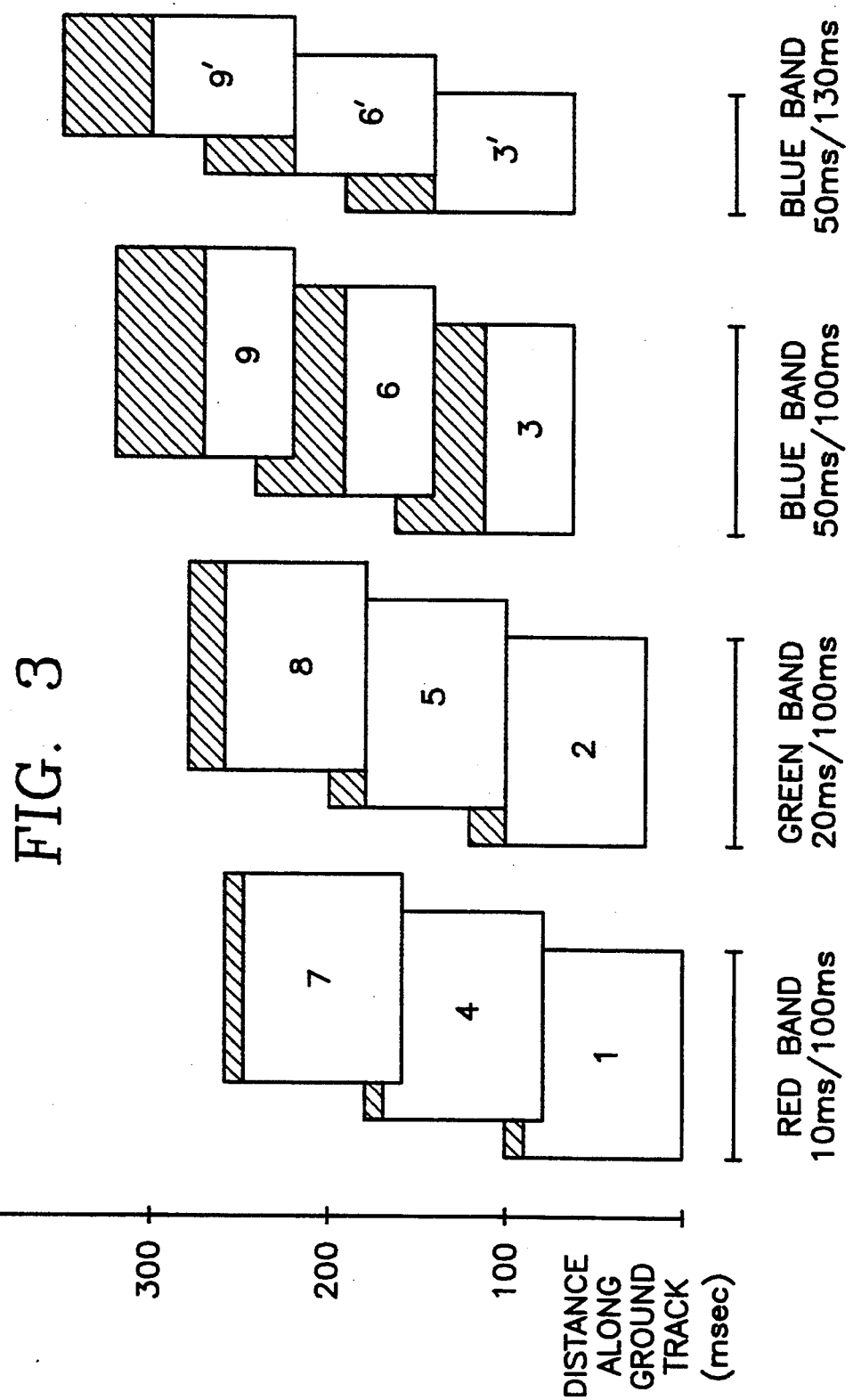
FIG. 3 illustrates how to form contiguous image strips from the results of the method of FIGS. 2d through 2f.

The limitations on the sizes of the exposures that can be obtained are illustrated in FIG. 3. Here, nine image frames are projected on to a map base. Successive frames have been offset slightly from one another and frames acquired with different spectral filters are shown separately in order to show more clearly the spacings along the flight path. The intensity ramp on the leading edge of the frame is shaded; the symmetrical intensity ramp on the trailing ramp is omitted for clarity.

Any object will remain in the field of view for 100 milliseconds. As a result the cycle of running through filters must certainly be completed in less than 100 milliseconds to avoid gaps. The exposure sequence in this case is:

| Red Filter | 10 milliseconds |
| Green Filter | 20 milliseconds |
| Blue Filter | 50 milliseconds | which leaves 20 milliseconds to spare.

A general condition for the performance limits of this kind of imaging system with q filter selections is:

$$(t_1 + t_2 + \ldots + t_q) \leq T, \quad (1)$$

where $t_1, t_2, \ldots, t_q$ are exposure times in successive spectral bands and T is the time required for an object to traverse the field of view. In principle, q can be arbitrarily large, and is limited primarily by the switching speed of the SAF.

This relationship only applies, however, if it is possible to recover signal from the ramp regions. If only the regions of uniform exposure are used, then the image portions corresponding to shaded areas of FIG. 3 must be discarded. In this case, the red frames still have overlap, the green frames just provide complete coverage but the blue frames have substantial gaps.

A general condition for the performance of this kind of imaging system with q filter selections is:

$$(t_1 + t_2 + \ldots + t_q) \leq (T - \text{MAX}[t_1, t_2, \ldots, t_q]) \quad (2)$$

where "MAX$[t_1, t_2, \ldots, t_q]$" is the maximum value of $t_1, t_2, \ldots, t_q$.

An alternative to recovering image data from the exposure ramps (shaded regions) would be to use a larger focal plane array. The right-most frame grouping in FIG. 3 (labelled 3', 6', 9') illustrates the sequence for the blue channel. This preferred sequence uses an FPA for which an object takes 130 milliseconds to traverse the field of view. The preferred sequence provides contiguous coverage (no overlap/no gaps) for the blue images with exposure time 50 milliseconds and overlap for both the red and the green.

E. Relationship to a Discrete Focal Plane

In an implementation of the above concept using a discrete focal plane array, time in milliseconds translates into pixel steps measured along track. For example, if the scene advances by one pixel in a millisecond then the image motion compensation for red, green and blue respectively would be implemented by 10, 20 and 50 shift operations respectively.

II. IMPLEMENTATION WITH A FOCAL PLANE ARRAY

The imaging geometry is again as illustrated in FIG. 1. An image or scene 100 of the surface of the earth (for example) is focussed by imaging foreoptics 102 through an SAF 104 such as an AOTF on to the surface of a focal plane array (FPA) 106 having L columns and N rows of picture elements or pixels. The height of one frame is understood to be N pixels in this example. The foreoptics 102, the SAF 104 and the FPA 106 are all mounted on an airborne or orbiting platform moving relatively to the scene 100. For simplicity, the orientation of the foreoptics 102 and FPA 106 is such that the direction of motion is parallel to columns of pixels in the FPA 106.

Freeing ourselves for a moment from preconceptions about the kinds of operations that can be performed on this moving image, let us establish the various ways in which information can be recorded on an array of discrete pixels. For simplicity we will restrict consideration to viewing near the nadir where scale differences across the array are negligible.

One mode of operation might be to change the spectral passband each time the scene 100 advances by a pixel separation (i.e., the distance between adjacent pixel centers in a column of the FPA 106) along the ground track. Up to N spectral channels of data (the number of pixel rows) each with a maximum exposure of dT, the time in which the image of the scene advances by a pixel separation along the ground track, can be acquired before the scene advances the width of the frame. By cycling through the N spectral channels, a series of immediately contiguous frames of the surface of the earth are acquired which form a continuous strip map along the ground track. This operation is illustrated for two cycles, each cycle consisting of five frames (labelled "1", "2", etc. through "10") in FIG. 4a for an array with N equal to 5. Note that with the discrete array, the maximum number of filter selections for continuous coverage is N, in accordance with the illustration of FIG. 4a.

Figure 4A:
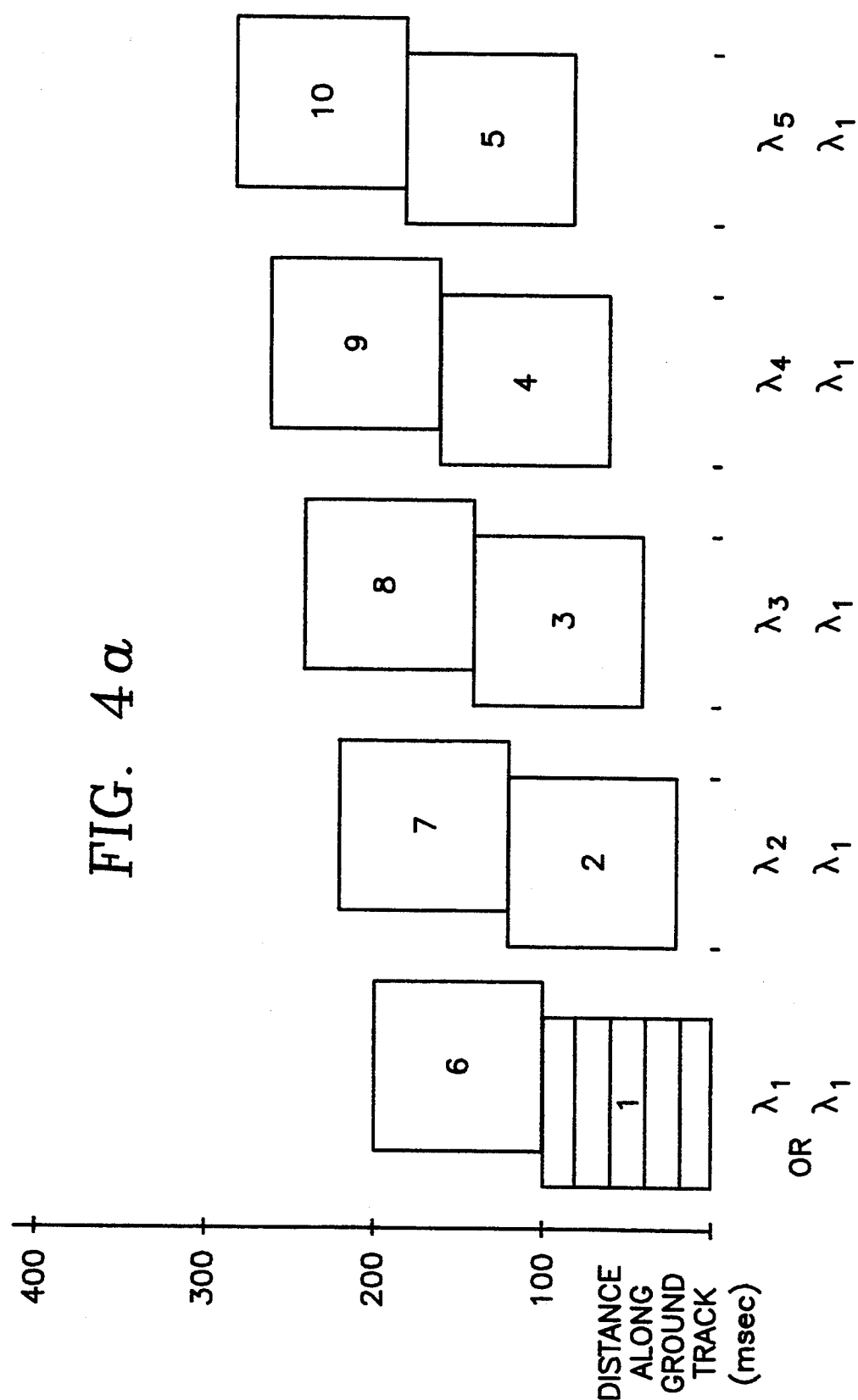
FIG. 4a and FIG. 4b illustrate the method of FIG. 3 applied to focal plane arrays having discrete photosensitive elements.

Another mode, useful in circumstances where the light exposures are restricted by low radiance, narrow filter bandwidth and/or rapid frame times, is to admit only a single spectral band and co-add the signal to improve signal-to-noise. In effect, this provides electronic image motion compensation (IMC). The net exposure time for each resolution element is increased from dT to N×dT, thereby improving image signal-to-noise. This mode of operation is also illustrated in FIG. 4a.

Figure 4B:
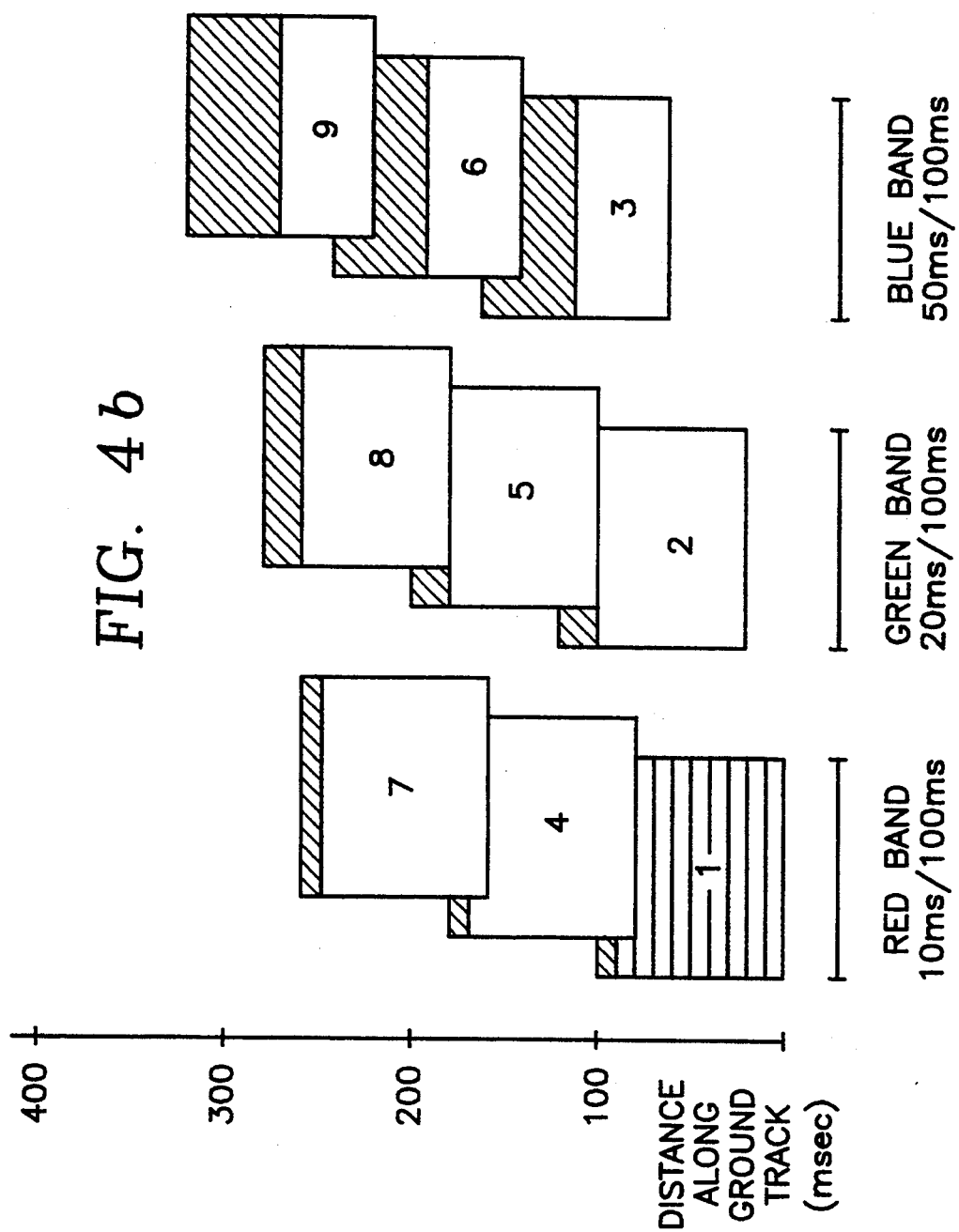

The most powerful embodiment of the present invention, however, is a combination of spectral bandpass variation and image motion compensation. In this case, the number of spectral channels chosen and the integration times for contiguous strip coverage must satisfy the following inequality:

$$(n_1 + n_2 + \ldots + n_{q-1} + n_q) \leq N \quad (3)$$

where $n_1, \ldots n_q$ are the multiples of the exposure time dT for each of the spectral channels or bands 1 through q. The relationship with inequality (1) will be quite evident. (However, note that $n_1, n_2, \ldots, n_{q-1}, n_q$ only take the discrete values $1, 2, 3, \ldots$, etc., whereas $t_2, \ldots, t_q$ vary continuously.) This option is illustrated in FIG. 4b for nine consecutive frames labelled "1", "2", etc., again using an array with N=10. In this example, only three spectral bands are used. The particular selection of $n_1, n_2, n_3$ illustrated here is $n_1=1$, $n_2=2$ and $n_3=5$ satisfying the inequality (3).

Although in the illustrations of FIGS. 4a and 4b, N is shown with a very small value, values of N=100 to 1000 are preferred. This provides the possibility of simultaneously providing a large number of spectral channels and substantial exposure time multiples.

A number of advantages are evident for this technique for the PHIMAP technique for acquiring hyperspectral data:

1. Relative to the imaging spectrometry technique of U.S. Pat. No. 4,497,540, it provides a capability for image motion compensation. It also enables the instrument user to flexibly allocate the resource of the number of focal plane array rows to provide larger exposure time multiples for spectral channels with the lowest radiance. In this way, improvement in signal-to-noise ratio and the number of spectral channels can be traded against one another under the constraint of the inequality (1).

2. By implementing image motion compensation (IMC) and related signal processing operations on the focal plane array, the rate and volume of digital data that must be handled by the spacecraft science data management system can be drastically reduced.

3. By programming both the SAF 104 and the FPA 106 with spectral "matched filters", specific mineral or vegetative types can be identified by analog operations implemented within the instrument without requiring an auxiliary signal processor.

4. Adaptive modes of image acquisition are feasible in which the data acquired in one frame can trigger more detailed and comprehensive spectral coverage during the same orbit.

To achieve these capabilities, requires SAFs and FPAs with the speed of response to change spectral bands and perform the requisite image processing operations at time scales comparable to or less than dT. It also requires that these devices have high throughput, superior radiometric fidelity and can maintain high spatial resolution simultaneously under these conditions.

III. IMPLEMENTATION WITH A CHARGE COUPLED DEVICE

The specific implementation considered here uses an Acousto Optical Tunable Filter (AOTF) for the SAF and a frame transfer silicon charge coupled device (CCD) for the focal plane array. This device would be useful for the spectral range from 0.1 to 1.0 µm.

A. Spectrally Agile Filter

Referring now to FIG. 1, in the AOTF version of the SAF 104, the spectral pass band is changed by an RF driver 110 exciting an acoustic signal (at RF frequencies) in a crystal with strain-dependent refractive properties. The spectral bandpass can be changed by modifying the frequency of excitation.

The present generation of non-collinear AOTFs fabricated in tellurium oxide can provide throughput in excess of 50% in the spectral range from 0.5 to 5.0 µm. Although existing devices do suffer from thermal-distortion induced resolution loss at the highest levels of throughput, these effects are most serious in the mid range infrared. Wavelength-dependent translation of the image can be compensated either optically or electronically. Sub-millisecond random access for spectral selections is quite feasible which satisfies requirement that spectral access time be small compared to dT.

The PHIMAP could also be implemented with other forms of SAF's.

B. Focal Plane Array

Figure 5A:
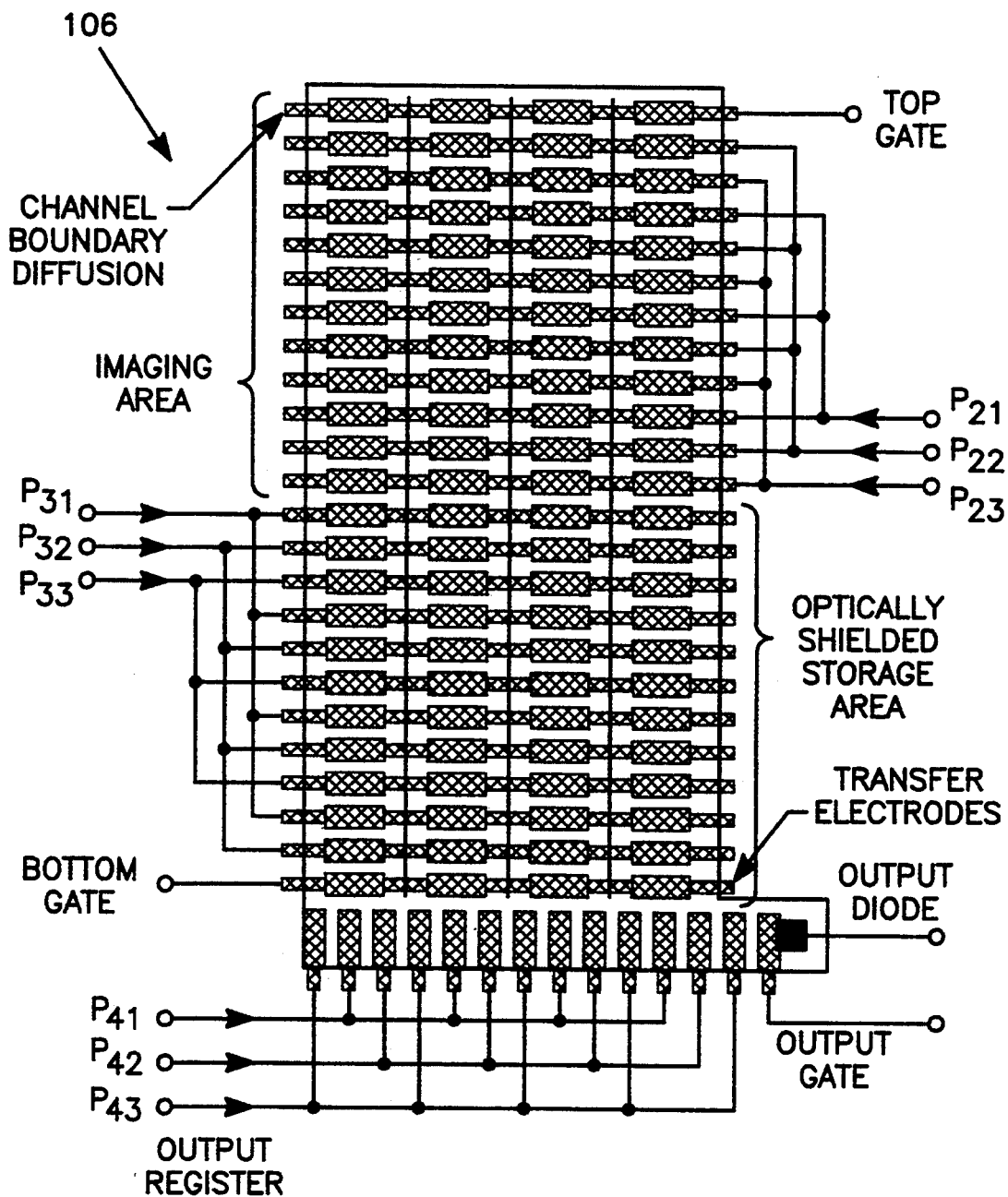
FIGS. 5a and 5b comprise a diagram illustrating focal plane array apparatus employed in carrying out the invention.
Figure 5B:
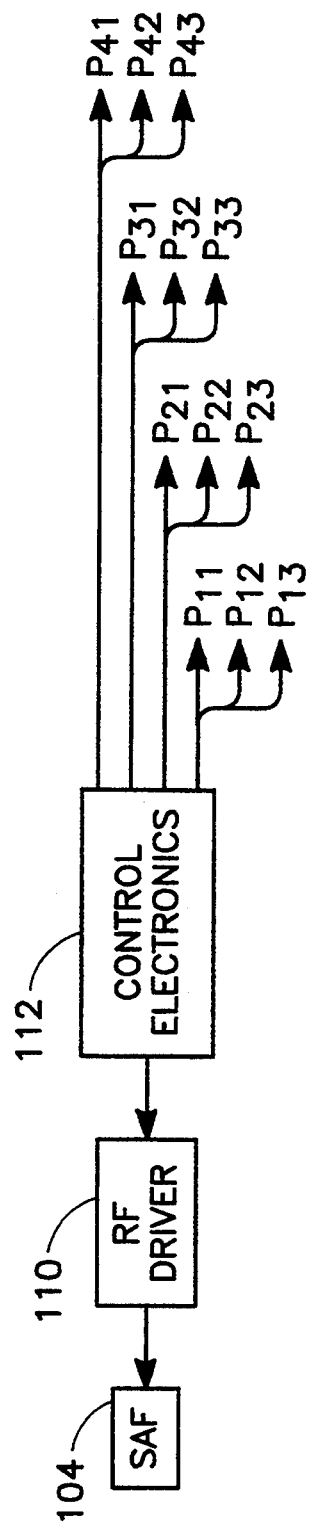

The specific implementation of PHIMAP examined here is illustrated in the diagram of FIGS. 5a and 5b, and uses a fairly conventional frame transfer silicon CCD controlled by control electronics 112 which also control the SAF 104. Although the construction of the FPA 106 in the novel system of FIGS. 5a and 5b is conventional, the manner in which the device is electrically operated by the control electronics 112 is not.

C. Spectral image acquisition: without image motion compensation

Figure 6A:
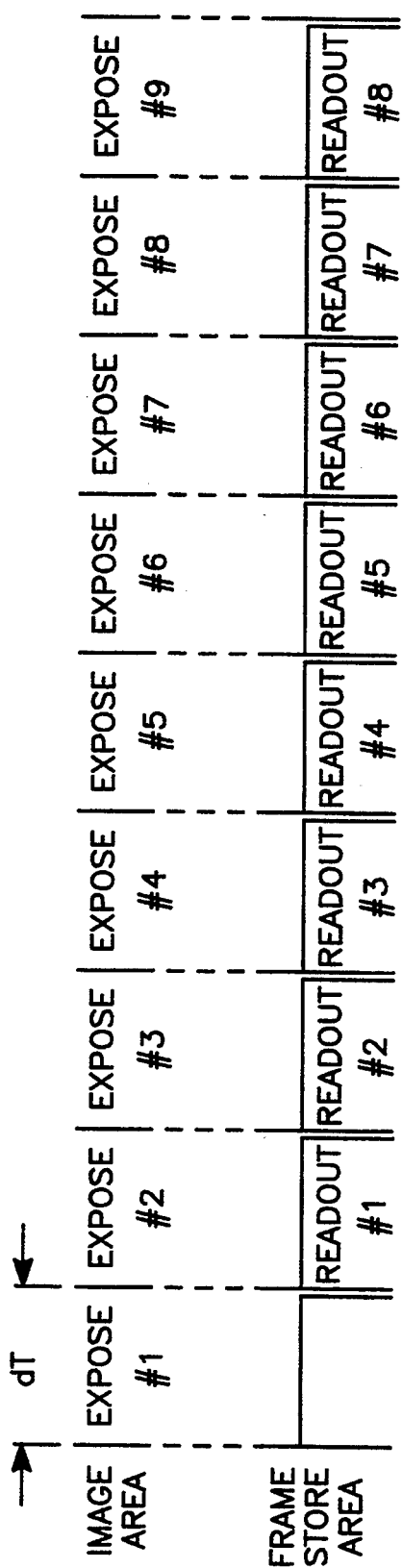
FIG. 6a illustrates a first mode of the invention for operating the apparatus of FIG. 5.

In the mode of operation depicted in FIG. 6a, the imaging area of the CCD is exposed to light for the desired exposure time. At the completion of the exposure, the optically generated electric charge is rapidly transferred into the optically-shielded frame-store region of the device by synchronously clocking the parallel gates $P_{21}$, $P_{22}$, $P_{23}$, $P_{31}$, $P_{32}$, $P_{33}$, in both the image and frame store areas respectively. This transfer operation can be executed in a few tens of microseconds which is usually short enough to eliminate image smear.

During the next exposure of the CCD, the parallel gates in the frame store and image areas of the CCD are decoupled. Charge transfers are implemented in the optically-shielded frame store area, but not in the active image area, so that lines of image data are sequentially shifted into the serial gate and read out through an on-chip amplifier (not shown) and the signal levels digitized. This is accomplished by synchronously clocking the CCD gates $P_{31}$, $P_{32}$, $P_{33}$, $P_{41}$, $P_{42}$, $P_{43}$. This readout process must be completed in time for the transfer of the next exposed image from the imaging arena. By using as much of this period as possible and minimizing the readout bandwidth, the readout electronic noise is minimized.

If the spectral band is changed synchronously with the frame transfer operation and the time between frame transfers (dT) is synchronized with the time required to advance by one pixel width along the ground track, we have a hyperspectral imaging capability of the form of FIG. 4a. In principle, by not changing spectral bands at the time of each frame transfer, we can generate multiple sets of image data in the same spectral band which can be co-added off focal plane to improve signal-to-noise. However, as will now be discussed, of particular interest is an on-focal-plane scheme for performing this coadding operation before the readout amplifier and analog-to-digital conversion noise is added to the signal.

D. Spectral image acquisition: with on-focal plane image motion compensation

An image of the earth is focussed through the AOTF onto the CCD, which has an imaging section with L columns and N rows of detectors. The camera must be oriented with the direction of spacecraft motion parallel to the columns of pixels in the CCD. Because of spacecraft motion, the image of the scene advances by one pixel along the ground track in a time dT.

As the spacecraft advances by one pixel separation along the ground track, the parallel clock in the imaging area is used to scroll the FPA by one pixel spacing so that the electronic image remains registered with the optical image. This can be repeated several times until adequate signal accumulates. At the conclusion of n image shifts, a frame transfer operation takes place and is synchronized with a change of spectral band. This last operation distinguishes this sensor from a conventional CCD-based electronic Image Motion Compensation (IMC) system. Readout is initiated immediately after frame transfer.

Figure 6B:
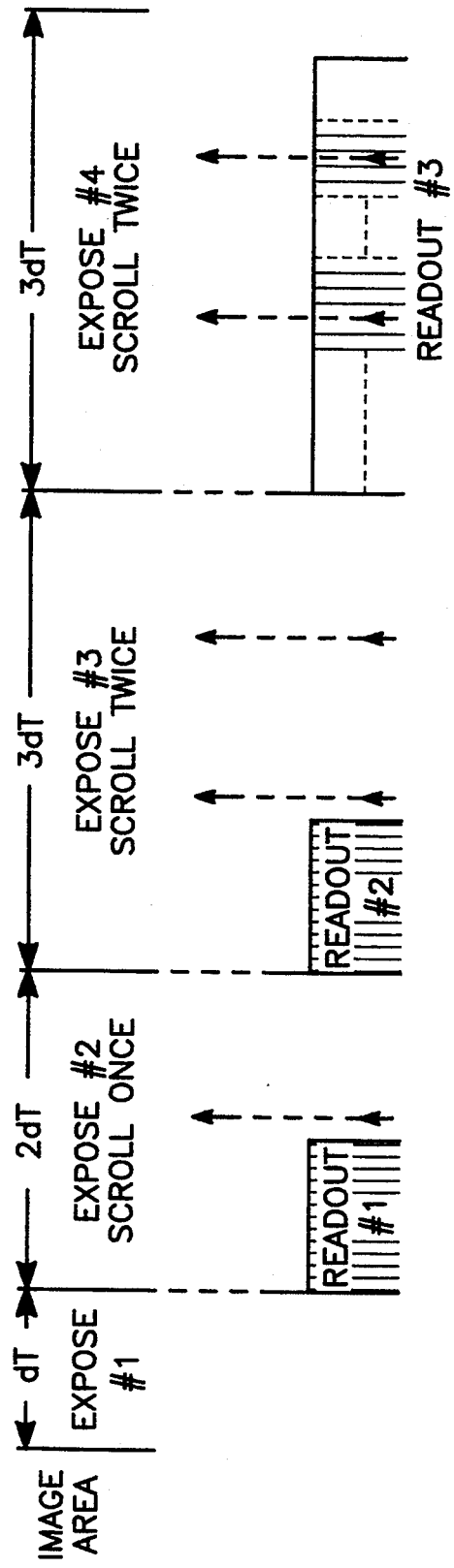
FIG. 6b illustrates a second mode of the invention for operating the apparatus of FIG. 5 in which image motion compensation is performed.

In the mode of operation illustrated in FIG. 6b, the coadding operation is performed in analog fashion on the focal plane array by using the parallel clocks $P_{21}$, $P_{22}$, $P_{23}$ controlling the image area to scroll the FPA 106 by pixel spacing each time period dT that the motion of the optical image of the earth surface across the array progresses by one pixel. This is illustrated in FIG. 6b for exposures of dT, 2 dT, and 3 dT. At the conclusion of each exposure, a frame transfer operation takes place and is synchronized with a change of spectral band. Readout is initiated immediately after frame transfer. If the same readout rate is used as in conventional operation, then for anything more than a single exposure, readout will be completed in a fraction of a typical exposure time.

With this implementation, the signal-to-noise of the image is improved by doubling or tripling the number of photogenerated electrons generated for each spatial and spectral resolution element. This is because the image motion compensation provides an effective exposure time of n×dT sec. A further gain can be realized by exploiting the longer exposure time to lengthen the readout time. This reduces the read noise, i.e. the uncertainty with which the signal levels are measured. Lengthening readout is practical if successive spectral bands have about the same value or gradually increasing values of n. Thus, there are two different ways in which data quality is improved in this particular PHIMAP implementation. Note that if the readout time is lengthened, the scrolling operation for image motion compensation must be synchronized with the much faster readout or scrolling operation used to read image data from the frame store area to the signal chain as illustrated in FIG. 6b.

For n=10, a SNR gain of 30 is possible in the low signal read-noise-dominated regime; at higher signal levels, where shot noise or fixed pattern noise dominates, the SNR improvement decreases to a factor of three. At intermediate signal levels, the SNR improvement lies between these values.

E. Registration and Mapping of images

A long-recognized disadvantage of framing imagers for spectral mapping from an orbital spacecraft has been the data management and computational problems of registering frames within a swathe. Even when registration can be performed, the typical fractional pixel offsets cause spurious spectral signatures. This can be mitigated by spatial resampling but this results in a loss of spatial resolution. Techniques for overcoming these problems are discussed here.

Synchronization and alignment of images would be implemented by inserting "synch" frames at regular intervals in the imaging sequence. The synch frames are spaced such that surface features can be tracked through at least two and possibly more frames. Although ideally all the synch frames should be acquired through the same spectral filter, in practice because of the high correlations in brightness between spectral bands for most natural scenes, different spectral bands may work perfectly adequately.

By cross-correlating areas containing high scene activity in two successive frames, fractional pixel misalignment across track between the synch frames and intervening frames can be eliminated. Correlation data would also be used to synchronize the image motion compensation with the along track motion.

F. Comparison of PHIMAP-1 with "ideal" PHIMAP sensor

The CCD implementation described here (PHIMAP-1) falls short of the performance of the ideal PHIMAP focal plane array characterized by the inequality (3) stated previously herein. Areas of exposed image which transfer in or out of the active frame area during an exposure because of the scrolling operation needed for image motion compensation, are not reconstructed into image data on the focal plane and must be discarded. It is possible to envisage focal plane architectures in which these data would be retrieved but it requires large amounts of on-focal plane storage. However, the loss is quite small except for the case of extreme amounts of image motion compensation. Taking this effect into account, PHIMAP-1 performs as if the imaging array height were reduced by the maximum IMC used in the imaging sequence by obeying the following requirement more stringent than the requirement of inequality (3):

$$(n_1+n_2+ \ldots +n_q) \leq [N-\text{MAX}(n_1-1, n_2-1, \ldots, n_q-1)], \quad (4)$$

(where "MAX(...)" denotes the maximum value of the set of quantities in parentheses), which is clearly analogous to inequality (2).

A further reduction in effective imaging array height would occur if the frame transfer time were not short compared with exposure times. This is only expected to become a factor with very large arrays used at very short dwell times.

PERFORMANCE ANALYSIS

There are three principal contributions to the noise that corrupts the measurement of intensity differences with a focal plane array: read noise, shot noise and fixed pattern noise. Read noise is independent of the intensity of the signal being observed and is a characteristic of the sensing system. Shot noise is a result of the statistical character of the photon field and depends on the square root of signal intensity. Fixed Pattern Noise is directly proportional to signal intensity. Because of these dependencies, read noise dominates at small signal levels, shot noise is most important at moderate intensities and fixed pattern noise is most important at high intensities. Noise contributions from temporal variability in calibration and non-linearity which are important in some types of infrared detector are not considered here.

Implementation of a PHIMAP using a frame-transfer charge coupled device has the effect of increasing the signal registered on the detector by an amount n, where n is the number of pixels of image motion compensation used for that particular spectral band. For instance if n=10 then the signal recorded by the detector will increase by a factor of 10. However, to gauge the impact on overall performance or signal-to-noise, it is necessary to consider the impact on the three primary contributors to noise.

a) Read noise is reduced because PHIMAP allows the time available for readout of the detector to be increased. In high performance CCD's, the read noise depends on the square root of the bandwidth. Operating with n=10 can reduce the read noise by a factor of 3.16 in the high speed regime where these systems operate.

b) Shot noise decreases relative to the signal because with n=10, signal is increased by a factor of 10 but shot noise depending on the square root of signal only increases by a factor of 3.16.

c) Fixed Pattern Noise decreases relative to the signal provided that the fixed pattern noise approximates a random distribution which is approximately satisfied for many sensors. In the case of n=10, the mean response of a group of 10 pixels will have a variance which is a factor of 3.16 lower than a single pixel. As a result, when n=10, the signal increases by a factor of 10, but the fixed pattern noise will only increase by a factor of 3.16.

IV. SPECTRAL CAPABILITIES OF PHIMAP-1

A. Spectral Equalization

It is characteristic of natural scenes, that different spectral ranges can have widely different brightnesses. For example, in the 1 to 2.5 $\mu$m spectral band, the brightness varies by almost two orders of magnitude as a result of the roll-off in the spectral brightness of the illuminating solar radiation. As noted earlier, imaging spectrometers do not permit the exposure in each spectral band to be varied. The exposure in each spectral band is the same and equal to the signal pixel dwell time, i.e. the time the spacecraft takes to advance a signal pixel width along the ground track. In PHIMAP, on the other hand, the total exposure time available for all channels is the time the spacecraft takes to advance of an entire frame width along the ground track. With frame widths of several hundred pixels, this exposure time is large and can be flexibly allocated between spectral bands. An example of how this might be implemented in the 1 to 2.5 $\mu$m region is illustrated in FIG. 6b.

B. Spectral Bandpass Control

The PHIMAP-1 has the capability for additively combining signals from a number of spectral bands on the FPA. This allows a complex spectral passband to be synthesized and changed adaptively during the mission. By tailoring the spectral passband to optimize discrimination of those spectral signatures to be mapped, it enables information to be acquired with FPA data rates that are much lower than for the equivalent imaging spectrometer.

There are several ways in which spectral bandpass control may be implemented. We will focus on only two here:

a) Sub Pixel Dwell Time Spectral Scanning: In this mode, the AOTF is programmed to sweep out a spectral bandpass during the pixel dwell time. This provides a great deal of flexibility in allocating the frame time to complex family of matched filters. However, the recruited sweep speeds may exceed those conveniently available. More seriously, any chromatic image shift cannot be corrected.

b) Spectral Scanning Synchronized with Pixel Stepping: In this mode, the spectral band changes are synchronized with Pixel Shifts. This has the advantage that any chromatic shift could in principle be corrected by image scrolling. Its disadvantage is that the number of steps available in the IMC mode is likely to be much less than the total number of spectral channels that are desired.

C. Adaptive Signal Processing

Assembly of strip images and mutual registration of spectral information was described hereinabove with reference to FIGS. 2d-2f and FIG. 3. Comparison of a pair of matched filtered images can then be performed to greatly enhance compositional discrimination relative to what is possible with a single frame.

By performing real time processing of these signatures it should be possible to adaptively acquire data. For instance, the first part of a frame time could be allocated to a filters searching for a particular signature. If the signature appeared, this might be used to initiate storage of data or even acquisition of higher resolution data during the remainder of the frame time.

V. APPLICATION TO INFRARED HYPERSPECTRAL IMAGING

Most of the above considerations apply to applications of the PHIMAP technology in the "silicon" spectral range i.e. from 0.1 to 1.0 $\mu$m. The spectral range from 1 to 2.5 $\mu$m is the other key spectral range that must be examined for this technology.

A. AOTF capabilities

Tellurium oxide has high transmission from 0.5 to 5.2 $\mu$m and these AOTFs have been demonstrated throughout this spectral range.

B. Focal Plane Array Technology

At present there is no practical monolithic infrared CCD technology in which detection and transfer of charge takes place in the same semiconductor. Consequently, a straightforward adaptation of the PHIMAP concept described above for the "silicon" spectral region is not possible. Here we consider some alternatives:

1. Mercury Cadmium Telluride Hybrid Arrays

In an early form of this technology, a "direct injection" circuit is used to inject charge from a Mercury Cadmium telluride diode into the well of a silicon CCD. The simplest concept for an infrared PHIMAP is to build a hybrid direct injection array using a frame transfer CCD.

2. Platinum Silicide Schottky Barrier CCD.

This focal plane array technology has a number of advantages: it is monolithic and highly producible, and these devices can approach the uniformity of a silicon VNIR CCD and very low noise operation is possible in the CCD architecture. 3. Z Plane technology The application of Z plane technology focal planes to PHIMAP sensors may be carried out by the skilled worker in accordance with the foregoing.

While the invention has been described in detail by specific reference to preferred embodiments, it is understood that variations and modifications thereof may be made without departing from the true spirit and scope of the invention.

What is claimed is:

1. AA hyperspectral imager, comprising:
   focal plane means comprising an array of spaced pixel recording means for receiving light from a scene moving relative to said focal plane means in a longitudinal direction, said pixel recording means being transportable at a controllable rate in said focal plane means in said longitudinal direction by rate-controllable transport means;
   controllable electronic shutter means for adjusting an exposure time tq of said focal plane means, whereby pixel recording means in an active area of said focal plane means are removed therefrom and signal charges accumulated therein are stored upon expiration of said exposure time;
   controllable electronic spectral filter means for selecting a spectral band q of light received by said focal plane means from said scene for each exposure time tq; and
   electronic controller means connected to said transport means, to said electronic shutter means and to said electronic spectral filter means for controlling (a) said controllable rate at which said recording means is transported in said longitudinal direction, (b) said exposure time tq and (c) said spectral band q so as to record in respective ones of said pixel recording means a selected portion of said scene through M spectral bands with a respective exposure time tq for each respective spectral band q, wherein M is a positive integer.

2. The hyperspectral imager of claim 1 wherein during said exposure time tq each pixel recording element is transported by m pixel spacings in said longitudinal direction while said scene advances in said focal plane means by m pixel spacings in said longitudinal direction, whereby pixel values of said scene as recorded in said pixel recording means are co-added m times so as to enhance a signal-to-noise ratio thereof, and wherein m is a positive integer.

3. The hyperspectral imager of claim 2 wherein $t_q$, M and m are each different numbers for different values of q, whereby different scene portions are recorded in different groups of said pixel recording means with a respective exposure time $t_q$ from each band q and co-added a different number of times m for each respective spectral band q.

4. The hyperspectral imager of claim 2 wherein a uniformly illuminated portion of said focal plane means corresponding to said co-added pixel values comprises a fraction of the entire focal plane means such that the fraction of the entire focal plane means comprising the uniform illuminated portion varies in inverse proportion to said exposure time.

5. The hyperspectral imager of claim 1 wherein said focal plane means comprises a charge transfer device and said pixel recording means comprise charge packets therein characterized by amounts of charge proportional to an amount of light received by said focal plane array at locations coincident with said charge packets.

6. The hyperspectral imager of claim 5 wherein said charge packets are transported at a speed equal to a speed at which said scene advances across said focal plane array in said longitudinal direction.

7. The hyperspectral imager of claim 6 wherein said charge transfer device comprises N rows of said pixel recording means transverse to said longitudinal direction, and wherein exposure time tq corresponds to a number $n_q$ of pixel rows across which said scene advances during said exposure time tq, and wherein the number of spectral bands M and the exposure times tq are constrained by said electronic controller means to satisfy $$n1+n2+ \ldots +n_q+ \ldots +nM<N.$$

and wherein N and $n_q$ are positive integers.

8. The hyperspectral imager of claim 7 wherein M=N for maximum number of recorded images of said scene in different spectral bands.

9. The hyperspectral imager of claim 7 wherein M=1 for maximum exposure time and maximum co-adding of said pixel values for maximum signal-to-noise enhancement of said scene in a single spectral band.

10. The hyperspectral imager of claim 1 wherein said electronic spectral filter means comprises one of a class of devices which includes an acousto-optical tunable filter.

11. The hyperspectral imager of claim 1 wherein said focal plane array vies said scene through an aperture having a fixed slit size.

12. A method of operating hyperspectral imaging apparatus, said apparatus comprising focal plane means comprising an array of pixel recording means for receiving light from a scene moving relative to said focal plane means in a longitudinal direction, said pixel recording means being transportable at a controllable rate in said focal plane means in said longitudinal direction by rate-controllable transport means, said method comprising:
   selecting an exposure time tq of said focal plane means, and removing pixel recording means exposed to a scene in an active area of said focal plane means from said active area and storing signals charges accumulated therein upon expiration of said exposure time tq;
   selecting a spectral band q of light received by said focal plane means from said scene for each exposure time tq; and
   recording a selected portion of said scene in respective groups of said pixel recording means through respective M spectral bands with a respective exposure time tq for each respective spectral band q, wherein M is a positive integer.

13. The method of claim 12 wherein during said exposure time tq each pixel recording element is transported by m pixel spacings in said longitudinal direction while said scene advances in said longitudinal direction by m pixel spacings, whereby pixel values of said scene are co-added m times so as to enhance a signal-to-noise ratio thereof, and wherein m is a positive integer.

14. The method of claim 13 wherein $t_q$, M and m are each different numbers for different values of q, whereby different scene portions are recorded in respective pixel recording means with a respective exposure time $t_q$ for each band q and co-added a different number of times m for each respective spectral band q.

15. The method of claim 13 wherein a uniformly illuminated portion of said focal plane means corresponding to said co-added pixel values comprises a fraction of the entire focal plane means such that the fraction of the entire focal plane means comprising the uniform illuminated portion varies in inverse proportion to said exposure time, and wherein said storing step comprises storing only the pixel recording means corresponding to said fraction.

16. The method of claim 12 wherein said focal plane means comprises a charge transfer device and said pixel recording means comprise charge packets therein characterized by amounts of charge proportional to an amount of light received by said focal plane array at locations coincident with said charge packets.

17. The method of claim 16 wherein said charge packets are transported at a speed equal to a speed at which said scene advances across said focal plane array in said longitudinal direction.

18. The method of claim 17 wherein said charge transfer device comprises N rows of said pixel recording means transverse to said longitudinal direction, and wherein each exposure time tq corresponds to a number $n_q$ of pixel rows across which said scene advances during said exposure time tq, said method further comprising constraining the number of spectral bands M and the exposure times tq to satisfy $$n1+n2+ \ldots +n_q+ \ldots +nM=N.$$

and wherein N and $n_q$ are positive integers.

19. The method of claim 18 wherein M=N for maximum number of recorded images of said scene in different spectral bands.

20. The method of claim 18 wherein M=1 for maximum exposure time and maximum co-adding of said pixel values for maximum signal-to-noise enhancement of said scene in a single spectral band.

21. The method of claim 12 wherein said electronic spectral filter means comprises one of a class of devices which includes an acousto-optical tunable filter.

22. The method of claim 12 wherein said focal plane array views said scene through an aperture having a fixed slit size.

23. In an imager comprising focal plane means comprising an array of spaced pixel recording means for receiving light from a scene moving relative to said focal plane means in a longitudinal direction, said pixel recording means being transportable at a controllable rate in said focal plane means in said longitudinal direction by rate-controllable transport means; hyperspectral imaging apparatus comprising:

controllable electronic shutter means for adjusting an exposure time tq of said focal plane means, whereby pixel recording means in an active area of said focal plane means are removed therefrom and signal charges accumulated therein are stored upon expiration of said exposure time tq;

controllable electronic spectral filter means for selecting a spectral band q of light received by said focal plane means from said scene for each exposure time tq; and electronic controller means connected to said transport means, to said electronic shutter means and to said electronic spectral filter means for controlling (a) said controllable rate at which said recording means is transported in said longitudinal direction, (b) said exposure time tq and (c) said spectral band q so as to record a selected portion of said scene in respective pixel recording means through M spectral bands with a respective exposure time tq for each respective spectral band q, wherein M is a positive integer.

24. The hyperspectral imager of claim 23 wherein during said exposure time tq each pixel recording element is transported by m pixel spacings in said longitudinal direction while said scene advances by m pixel spacings in said focal plane means in said longitudinal direction, whereby pixel values of said scene are co-added m times so as to enhance a signal-to-noise ratio thereof, and wherein m is a positive integer.

25. The hyperspectral imager of claim 24 wherein $t_q$, M and m are each different numbers for different values of q, whereby different scene portions are recorded with a respective exposure time $t_q$ for each band q and co-added in said pixel recording means a different number of times m for each respective spectral band q.

26. The hyperspectral imager of claim 24 wherein a uniformly illuminated portion of said focal plane means corresponding to said co-added pixel values comprises a fraction of the entire focal plane means such that the fraction of the entire focal plane means comprising the uniform illuminated portion varies in inverse proportion to said exposure time.

27. The hyperspectral imager of claim 23 wherein said focal plane means comprises a charge transfer device and said pixel recording means comprise charge packets therein characterized by amounts of charge proportional to an amount of light received by said focal plane array at locations coincident with said charge packets.

28. The hyperspectral imager of claim 27 wherein said charge packets are transported at a speed equal to a speed at which said scene advances across said focal plane array in said longitudinal direction.

29. The hyperspectral imager of claim 28 wherein said charge transfer device comprises N rows of said pixel recording means transverse to said longitudinal direction, and wherein each exposure time tq corresponds to a number $n_q$ of pixel rows across which said scene advances during said exposure time tq, and wherein the number of spectral bands M and the exposure times tq are constrained by said electronic controller means to satisfy $$n1+n2+ \ldots +n_q+ \ldots +nM<N.$$

and wherein N and $n_q$ are positive integers.

30. The hyperspectral imager of claim 29 wherein M=N for maximum number of recorded images of said scene in different spectral bands.

31. The hyperspectral imager of claim 29 wherein M=1 for maximum exposure time and maximum co-adding of said pixel values for maximum signal-to-noise enhancement of said scene in a single spectral band.

32. The hyperspectral imager of claim 23 wherein said electronic spectral filter means comprises one of a class of devices which includes an acousto-optical tunable filter.

33. The hyperspectral imager of claim 23 wherein said focal plane array views said scene through an aperture having a fixed slit size.

* * * * *